United States Patent Office 3,803,245
Patented Apr. 9, 1974

3,803,245
PROCESS FOR PREPARING 2-(6-METHOXY-2-NAPHTHYL) PROPIONIC ACID, AND INTERMEDIATE THEREFOR
Eric Lodewijk, Freeport, Bahamas, assignor to Syntex Corporation, Panama, Panama
No Drawing. Filed May 11, 1972, Ser. No. 252,291
Int. Cl. C07c 43/20, 43/28
U.S. Cl. 260—612 D        2 Claims

ABSTRACT OF THE DISCLOSURE

2 - (6 - methoxy - 2 - naphthyl)propionic acid is prepared by treating 6-methoxy-2-(1-propynyl) naphthalene with a thallic salt, such as thallium trinitrate, and a lower alkanol to yield the corresponding ester of 2-(6-methoxy-2-naphthyl)propionic acid which is hydrolyzed to the desired propionic acid compound. The compound is, preferably, resolved to yield the biologically active d isomer. The product has anti-inflammatory, analgesic and antipyretic activities.

BRIEF SUMMARY OF THE INVENTION

This invention relates to a process for preparing 2-(6-methoxy-2-naphthyl)propionic acid.

In general, the process of the present invention for preparing 2-(6-methoxy-2-naphthyl)propionic acid comprises the steps of treating 6-methoxy-2-(1-propynyl)naphthalene with a thallic salt, such as thallium trinitrate, and a lower alkanol to yield the corresponding ester of 2-(6-methoxy-2-naphthyl)propionic acid, and hydrolyzing the ester so produced to the desired compound, i.e., a racemic mixture of dl-2-(6-methoxy-2-naphthyl)propionic acid. After the 2-(6-methoxy-2-naphthyl)propionic acid is separated from the reaction mixture, it is, preferably, resolved to yield the biologically active d isomer.

The process of the present invention, including steps for preparing 6-methoxy-2-(1-propynyl)naphthalene from 2-methoxy-naphthalene, is represented by the following overall schematic reaction equation:

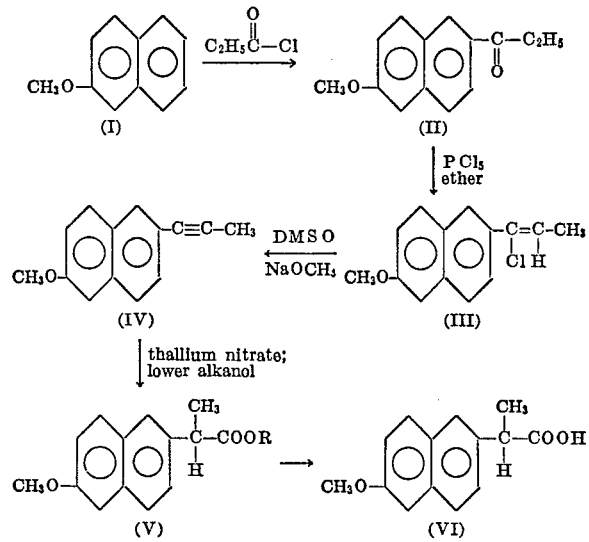

where R is a lower alkyl radical corresponding to the lower alkanol utilized.

The 2-methoxynaphthalene of Formula I is a well known compound which can be produced by heating beta-naphthol and methyl alcohol in the presence of sulfuric acid or by methylating beta-naphthol with dimethyl sulfate. The published literature may be referred to for other processes for making 2-methoxy naphthalene.

The compound of Formula II can be prepared by a Friedel Crafts reaction wherein 2-methoxy naphthalene is reacted with propionyl chloride in an inert solvent, such as, for example, nitrobenzene, in the presence of a Friedel Crafts catalyst, such as, for example, aluminum trichloride, $FeCl_3$, $ZnCl_2$, etc. This reaction is typically conducted at a temperature in the range of from about —20° C. to about 25° C. for about 8 to about 24 hours using mole ratios from about 1.05 to about 1.60 moles of propionyl chloride per mole of 2-methoxy naphthalene. The nitrobenzene is removed by steam distillation and the organic material is obtained by extraction with benzene, followed by distillation to give the compound of Formula II (see U.S. Pat. No. 2,683,738).

The novel compound of Formula III [i.e., 6-methoxy-2-(1'-chloro-1'-propenyl)naphthalene] can be prepared by reacting the compound of Formula II with $PCl_5$ in a inert aprotic solvent, such as diethylether, other ethers, benzene, toluene, and the like. However, diethyl ether is the presently preferred solvent since the use of other ethers or solvents results in lower yields and very impure products. This reaction can be conducted at a temperature in the range from about 5° C. to about the reflux temperature of the aprotic solvent for about 12 hours to about 24 hours using from about 2 moles to about 4 moles of $PCl_5$ per mole of compound of Formula II. It is presently preferred to reflux the compound of Formula II with about 3 moles of $PCl_5$ for 15 hours in anhydrous ether. To insure that the reaction goes to completion, high quality $PCl_5$ should be used. Other chlorinating reagents include acetyl chloride, thionyl chloride 2,2-dichlorodimethyl ether, and the like.

The novel compound of Formula IV [i.e., 6-methoxy-2-(1-propynyl)naphthalene] can be prepared by treating the compound of Formula III with dimethylsulfoxide and sodium methoxide. This reaction can be conducted at a temperature in the range from about 5° C. to about 30° C. for about 20 minutes to about 2 hours. Other bases, such as biazacyclononane or analagous nitrogen bases in chlorinated hydrocarbon solvents, such as chloroform or dichloromethane, can be used in this reaction. However, the use of classic bases, such as sodium or sodium alkoxide in methanol, ethanol or isopropanol, has proven to be unsuccessful.

Other techniques and procedures for preparing the compound of Formula IV may also be utilized. For example, 1-propynyl copper may be reacted with either (6-methoxy-2-naphthyl)magnesium bromide or 2-bromo-6-methoxy-naphthalene. In view of this disclosure, other techniques and procedures for preparing the novel intermediate, 6-methoxy 2-(1-propynyl) naphthalene, will be apparent to those skilled in this art.

The compound of Formula V is prepared by treating the compound of Formula IV with a thallic salt, such as thallium trinitrate, in the presence of a lower alkanol, such as methanol or ethanol. This treatment is conducted for ½ hour to 2 hours at temperatures in the range from about 0° C. to about 60° C., generally about room temperature. As used in this specification lower alkanol means a lower aliphatic alcohol having 1–4 carbon atoms, such as methanol, ethanol, propanol, isopropanol, n-butanol and the like, alone or in combination with halogenated hydrocarbons, such as chloroform, dichloromethane, and the like. However, while the reaction proceeds best in methanol, and can be run in ethanol, it does not proceed as well with the other lower alkanols. The lower alkanol should be present in excess since it also serves as the reaction medium.

The compound of Formula V formed in this reaction is then hydrolyzed to form the free acid by treatment with base followed by acidification or by treatment with a strong acid. For base hydrolysis, a solution of a strong base such as sodium or potassium hydroxide, in a suitable solvent, such as water, is mixed with the compound of Formula V, and the reaction mixture is maintained at a temperature from about 60° C. to reflux temperature until hydrolysis occurs. Usually from ten minutes to 6 hours is sufficient for this hydrolysis. The reaction mixture is then acidified with an acid, such as acetic acid, trifluoroacetic acid, p-toluenesulfonic acid, hydrochloric acid, sulfuric acid, phosphoric acid and the like to release the free acid. Alternatively, the reaction mixture, including the compound of Formula V, is mixed with a solution of a strong organic or inorganic acid such as trifluoroacetic acid, p-toluenesulfonic acid, hydrochloric acid, hydrobromic acid, hydroiodic acid, sulfuric acid, phosphoric acid, and the like at a temperature from about 60° C. to about 100° C. until hydrolysis occurs. Suitable solvents for this reaction include water, aqueous lower aliphatic carboxylic acids, and other solvent systems containing water.

The product compound of Formula VI is then separated from the reaction mixture by conventional procedures. For example, when the reaction mixture is acidified, the compound of Formula VI precipitates, and it can be removed by filtration and recrystallized from acetone-hexane. Alternatively, the product compound of Formula VI can be removed by extraction with ether or a similar solvent. Chromatography can also be used to purify and/or isolate the product compound of Formula VI.

The preferred product is d 2-(6-methoxy-2-naphthyl) propionic acid. To obtain this product, optical resolution of the compound of Formula VI can be achieved by selected biological degradation or by preparation of diastereo isomer salts of the 2-(6-methoxy-2-naphthyl)propionic acid with a resolved optically active amine base, such as cinchonidine or the like, and then separating the thus formed diastereo isomer salts by fractional crystallization. The separated diastereo isomer salts are then acid cleaved to yield the desired d 2-(6-methoxy-2-naphthyl) propionic acid.

The compound of Formula VI exhibits anti-inflammatory, analgesic and anti-pyretic activities and is, accordingly, employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-tramatic conditions and gout.

DESCRIPTION OF SPECIFIC EMBODIMENT

The following specific description is given to enable those skilled in this art to more clearly understand and practice the present invention. It should not be considered as a limitation upon the scope of the invention but merely as being illustrative and representative thereof.

30 g. of 6-methoxy-2-propionyl-naphthalene are charged to a 500 ml. round-bottom flask to which there is also added 300 ml. of anhydrous ether and 90 g. of high quality $PCl_5$ (Baker analytical grade). The mixture is refluxed for approximately 16 hours, i.e., until the reaction is completed as determined by thin layer chromatography using a solvent system of 50% $CH_2Cl_2$ in hexane. The reaction mixture is then poured slowly into 300 ml. of ice cold water and stirred for 1 hour during which time the ether is evaporated under vacuum. The 2-(1'-chloro-1'-propenyl)-6-methoxynaphthalene is collected by filtration and dried at 50° C. The product has a melting point of about 85–90° C. Yield is 99% of theoretical.

10 g. of 2-(1'-chloro-1'-propenyl)-6-methoxy naphthalene are charged to a 100 ml. flask to which there is added 100 ml. of dimethylsulfoxide and 10 g. of sodium methoxide. The reaction mixture is stirred at room temperature for 1 hour, neutralized with 50% sulfuric acid, and then added to 500 ml. of water. 6-methoxy-2-(1'-propynyl) naphthalene is collected by filtration and dried at 50° C. The product has a melting point of about 95° C. Yield is quantitative.

25 g. of 6-methoxy-2-(1-propynyl)naphthalene is charged to a 500 ml. flask to which there is added 250 ml. of methanol and 50 g. of $Tl(NO_3)_3 \cdot 3H_2O$. The reaction mixture is stirred at room temperatrue for one hour or until the reaction is complete (as determined by thin layer chromatography using a solvent system of 50% $CH_2Cl_2$ in hexane). 200 ml. of $CH_2Cl_2$ and 200 ml. of water are then added to the reaction mixture. The lower organic layer is separated from the aqueous layer. The aqueous layer is extracted twice with 50 ml. portions of $CH_2Cl_2$, and these organic extracts are combined with the main organic layer. The combined organic layer is washed first with a saturated sodium bicarbonate solution and then with a saturated sodium chloride solution. The $CH_2Cl_2$ is displaced with methanol and 5 g. of solid sodium hydroxide are added. After the sodium hydroxide has dissolved, the reaction mixture is heated at reflux for 2 hours. After substantially all of the methanol is removed from the reaction mixture, 100 ml. of water and 100 ml. of chloroform are added. The reaction mixture is mixed thoroughly and the lower organic layer separated from the basic water layer. The basic water layer is extracted with 100 ml. of chloroform. 50% sulfuric acid is added to the basic water layer to precipitate dl-2-(6-methoxy-2-naphthyl)propionic acid when a pH of about 7 is reached. 22.5 grams of this product are isolated by filtration and dried at 60° C. Yield is 77% of theoretical.

While the present invention has been described with reference to specific embodiments thereof, it should be understood by those skilled in this art that various changes may be made and equivalents may be substituted without departing from the true spirit and scope of the invention. In addition, many modifications may be made to adapt a particular situation, material or composition of matter, process, process step or steps, or then-present objective to the spirit of this invention without departing from its essential teachings.

What is claimed is:
1. 6-methoxy-2-(1'-propynyl)naphthalene.
2. 6-methoxy-2-(1'-chloro-1'-propenyl)naphthalene.

References Cited
UNITED STATES PATENTS 3,562,336  2/1971  Nelson _____ 260—520
3,651,106  3/1972  Harrison _____ 260—520

OTHER REFERENCES

Horeau et al.: "Bull Soc. Chim. France," 1954, pp. 511–14 (1954).

LEON ZITVER, Primary Examiner

N. MORGENSTERN, Assistant Examiner

U.S. Cl. X.R.

260—473 F, 520, 592